No. 815,765.　　　　　　　　　　　　PATENTED MAR. 20, 1906.
M. O. TROY.
ELECTRIC TRANSFORMER.
APPLICATION FILED OCT. 20, 1904.

2 SHEETS—SHEET 1.

Witnesses:

Inventor:
Matthew O. Troy,
by Albert G. Davis
Att'y.

No. 815,765. PATENTED MAR. 20, 1906.
M. O. TROY.
ELECTRIC TRANSFORMER.
APPLICATION FILED OCT. 20, 1904.

2 SHEETS—SHEET 2.

Witnesses:

Inventor:
Matthew O. Troy,
by
Att'y.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

ELECTRIC TRANSFORMER.

No. 815,765.    Specification of Letters Patent.    Patented March 20, 1906.

Application filed October 20, 1904. Serial No. 229,210.

*To all whom it may concern:*

Be it known that I, MATTHEW O. TROY, a citizen of the United States, residing at Schenectady, county of Schenectady, State of New York, have invented certain new and useful Improvements in Electric Transformers, of which the following is a specification.

In operating multiphase transformers it is occasionally desirable to supply one or more three-wire distribution systems, one such distribution system for each phase. Attempts have been made heretofore in this direction, but have been unsatisfactory because unbalanced loads when occurring in the system then employed had the effect of producing unbalanced voltages on the sides of the system.

In accordance with my invention I provide a multiphase transformer, and in the magnetic circuit of each phase which supplies a three-wire system I arrange the windings connected to the system so that current flowing in either side of the three-wire system traverses conductors which are distributed over the winding space in the transformer, so as to overlap or intermingle with the corresponding windings supplying the other side of the system. The objectionable unbalancing of voltage on the system is thus prevented.

The features of novelty which characterize my invention are pointed out with particularity in the appended claims. The invention itself, however, will be better understood by reference to the following description, taken in connection with the accompanying drawings, in which—

Figure 1:
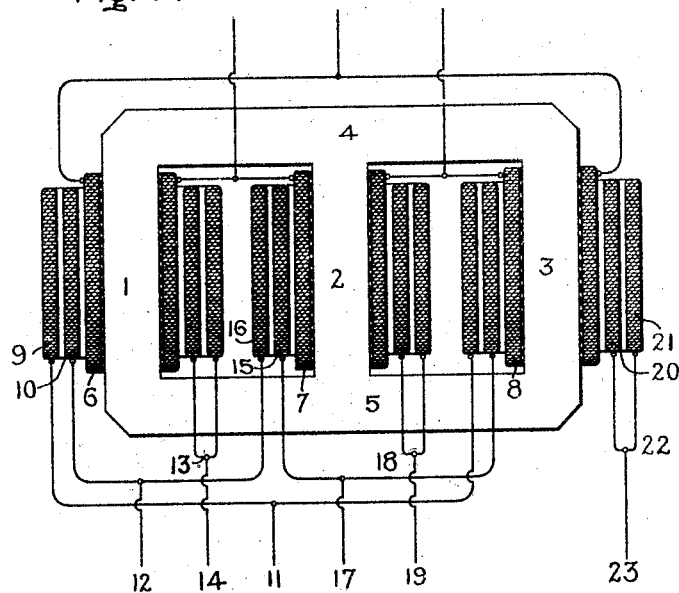
Figure 2:
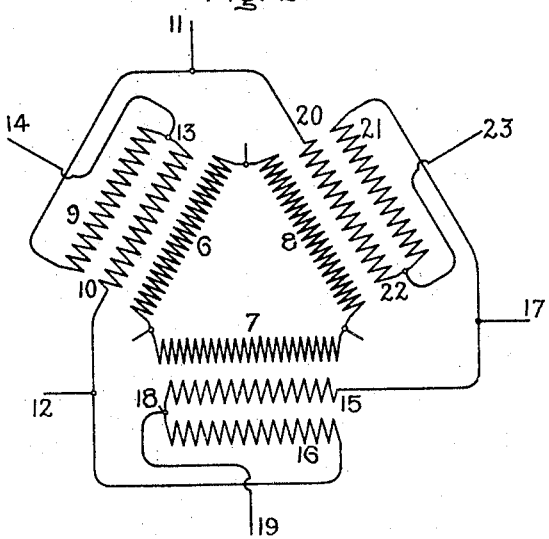
Figure 3:
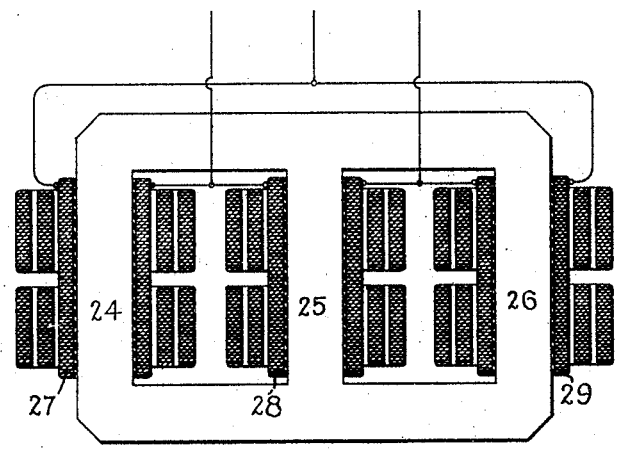

Figure 1 represents a three-phase transformer embodying my invention; Fig. 2, a diagram of the circuits of said transformer; Fig. 3, a three-phase transformer provided with a modified arrangement of windings, and Fig. 4 a diagram of these last-mentioned windings.

The transformer which in Fig. 1 I have chosen as an illustration of one form of my invention is of the three-phase core type. The core consists of three legs 1, 2, and 3, of laminated iron, joined at top and bottom by connecting members 4 and 5. On each of the legs 1, 2, and 3 are mounted primary and secondary coils corresponding to one phase. The primary windings are indicated at 6, 7, and 8 and may be connected either in Y or delta, as desired. A delta connection, however, is the one indicated in the drawings. For each phase two secondary windings are provided, or, what amounts to the same thing, a divided secondary. Thus corresponding to the primary 6 there are two series-connected secondary coils or windings 9 and 10, in this case placed one over the other. The terminals of the series-connected windings are joined to the leads or mains 11 and 12 of the three-phase system, while the junction point 13 between them is connected to the neutral conductor 14, which coöperates with these leads to form a three-wire system. In a similar manner the secondary windings 15 16 on the leg 2 are joined in series with each other and connected between the three-phase leads 12 and 17. In this case the junction 18 between these windings is connected with a neutral conductor 19, which coöperates with the three-phase mains 12 and 17 to constitute another three-wire distribution system. The remaining secondary windings 20 and 21 on the remaining leg 3 of the transformer, like the windings first mentioned, are connected in series with each other and with their free terminals joined to the corresponding three-phase leads 11 and 17. The junction 22 between these windings is connected to the remaining neutral conductor 23, which neutral conductor constitutes, with the three-phase leads 11 and 17, a third three-wire distribution system. It will be noticed that in the case of each pair of secondary windings each winding is distributed over the entire length of the corresponding primary winding and is therefore in substantially the same inductive relation thereto as is the other. When an unbalanced load occurs on the corresponding three-wire system, it will therefore be evident that the mutual induction between one secondary winding and the primary cannot be altered without likewise altering the mutual induction between the primary and the other secondary winding. The voltage of the two secondaries will therefore remain practically equal and will not be subjected to the disadvantage oftentimes present with certain forms of windings supplying a three-wire circuit. Since no unbalancing action thus is present on a given phase, there will be no disturbing effect produced thereby upon the magnetic circuits of the other phases of the transformer. The regulation of the transformer as a whole is thus more nearly perfect than in prior transformers of this nature.

Figure 4:
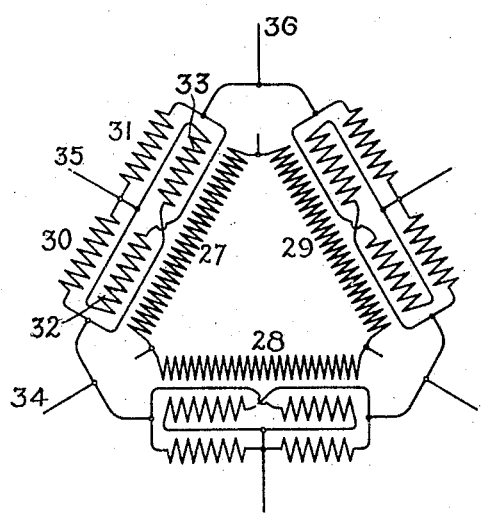

In Figs. 3 and 4 I have represented a somewhat-different arrangement of secondary windings. In this case each phase of the transformer, represented by the core-legs 24, 25, and 26, is provided with a primary winding, as at 27, 28, and 29, and with four secondary windings corresponding to each primary. These windings I have represented in cross-section in Fig. 3; but their interconnection, owing to difficulty in pictorial illustration, I have shown only in Fig. 4. Thus the primary 27 has four secondaries 30, 31, 32, and 33. The other primaries likewise are each provided with four secondaries; but since the arrangement is the same as in the case of the first set I do not think it necessary to refer to the same in detail. By providing four secondaries to each primary I am enabled to secure a number of different voltages from the combination. As the present invention has reference mainly to the idea of obtaining balanced voltages with unbalanced load on a multiple conductor system, I will refer only to those connections which may be used with the multiple conductor system. As the coils are shown connected in Fig. 4, it will be seen that between the main 34 and the neutral conductor 35 the coils 30 and 33 are connected, so that they operate in multiple with each other. One coil overlaps one half of the primary and the other coil the other half. In order to secure an equality of mutual induction between these coils and the remaining two, I choose for each pair an outside coil on one end and an inside coil on the other end of the winding-space. Thus the coils 31 and 32 occupy positions on the core with respect to the primary windings similar to the positions occupied by the first two coils and supply in multiple the current for the translating device between the neutral 35 and the three-phase main 36. The pairs of coils 30 33 and 31 32 instead of being multiple connected in the case of each pair may of course be series connected, in which case the arrangement of circuits becomes similar to that in Fig. 2, except for the additional advantage of cross connection between inner and outer coils in Fig. 4, which cross connection is preferable as involving a more nearly perfect equalization of the mutual induction between the sets of coils and the primary.

It will be evident that various modifications may be made in the embodiment of my invention without departing from the spirit thereof, for which reason I do not wish to be limited to the exact details shown and described.

What I claim as new, and desire to secure by Letters Patent of the United States, is—

1. A multiphase transformer having its magnetic circuits combined in a single structure, and a plurality of secondary coils for each phase, said coils being arranged to supply a three-wire system without unbalancing of voltages by unbalanced loads.

2. A multiphase transformer having its magnetic circuits combined in a single structure, and a plurality of secondary windings for each phase, each of said windings being in substantially the same inductive relation to the corresponding primary winding.

3. A multiphase transformer having its magnetic circuits combined in a single structure, a plurality of secondary windings for each phase, each of said windings having substantially the same inductive relation to the corresponding primary winding, and a multiple conductor system fed by said windings.

4. A multiphase transformer having its magnetic circuits in a single structure, a plurality of secondary windings for each phase, a three-wire system supplied by the secondaries of a given phase, and connections between the secondaries such that balanced voltages are maintained on the three-wire system with balanced or unbalanced loads.

In witness whereof I have hereunto set my hand this 19th day of October, 1904.

MATTHEW O. TROY.

Witnesses:
 BENJAMIN B. HULL,
 HELEN ORFORD.